United States Patent Office 3,443,955
Patented May 13, 1969

3,443,955
SENSITIZED SILVER HALIDE EMULSIONS
Mario Gandino, Ferrania, Savona, Paolo Merli, Carcare, Savona, and Oreste Turilli, Rome, Italy, assignors to Ferrania S.p.A., Milan, Italy
No Drawing. Filed May 20, 1966, Ser. No. 551,512
Claims priority, application Italy, May 21, 1965, 17,465/65
Int. Cl. G03c 1/08
U.S. Cl. 96—102    12 Claims The present invention refers to novel cyanine dyes prepared from heterocyclic bases of the 1-[α-pyridyl]-2-methyl benzimidazole type and to the use thereof for the sensitization of silver halide photographic emulsions.

Cyanine dyes (e.g. carbocyanine, merocyanine) prepared from heterocyclic nuclei such as thiazole, selenazole, benzoselenazole, imidazole, benzimidazole, oxazole, benzoxazole, and like have been usefully employed as optical sensitizers for photographic emulsions. It has now been found that novel dyes of the cyanine class can be obtained, from heterocyclic bases of the general formula:

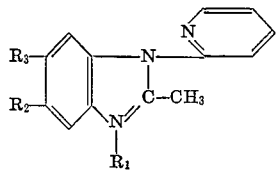

wherein $R_1$=alkyl (e.g., methyl, ethyl, n-propyl, n-butyl) or allyl (i.e., vinyl methyl) $R_2$ and $R_3$=hydrogen, halogen, acetyl, or carboxamido [R—NH—CO—, wherein R is alkyl, aryl, alkylaryl and arylalkyl].

The dyes prepared from these bases have been found to be outstanding for the sensitization of photographic emulsions. Furthermore they do not exhibit any residual stain and can be advantageously employed even in combination with supersensitizers.

In particular, the carbocyanine dyes derived from the bases of the invention correspond to the general formula:

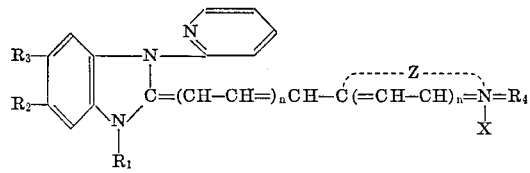

wherein $R_1$, $R_2$ and $R_3$ have the meaning hereinabove set forth and $R_4$ has the same meaning as $R_1$. X=An acid anion, e.g., halide, perchlorate, thiocyanate, benzenesulfonate, p-toluenesulfonate, methosulfate, ethosulfate, p-toluate, etc. $n$=A positive integer from 1 to 2. Z=Nonmetallic atoms required to complete a penta- or hexaatomic heterocyclic nucleus (such as substituted or unsubstituted thiazole, benzothiazole, naphthothiazole, etc.).

The merocyanine dyes deriving from the above bases correspond to the general formula:

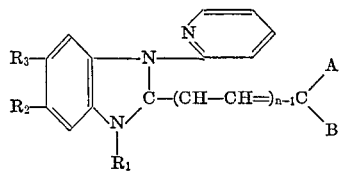

wherein $R_1$, $R_2$, $R_3$ and $n$ have the value hereinabove set forth, A and B together represent the members of a heterocyclic ring, for example substituted or unsubstituted pyrazolone, oxadiazole, rhodanine, 2-thio-2,4-oxazolidinedione, 2,4-thiazolidinedione, 2-thio-2,4-imidazolidinedione, etc.

The bases of the invention can be easily quaternized by the methods usually employed for preparing cyanine dyes, with alkyl halides, dialkyl sulfates, alkyl p-toluenesulfonates, aliphatic sultones, aliphatic α-halocarboxylic acids. The quaternary salts thus obtained may be used in all the usual condensation reactions in cyanine chemistry, preferably in the presence of a basic condensing agent, for example: trialkylamine, dialkylamine, a heterocyclic tertiary amine, etc. The condensation can be carried out in the presence of an inert solvent, as an alcohol, nitrobenzene, pyridine, etc.

The following examples are presented to better illustrate the invention without limiting the scope thereof.

Preparation I 2-nitro-4,5-dichloro-N-(2-pyridyl)-aniline 226 grams of 2,4,5-trichloronitrobenzene are admixed with 169 grams of 2-aminopyridine and heated at 145° C. for 96 hours. After cooling, about 5 liters of a 15% aqueous solution of NaOH are added and the excess 2-aminopyridine is removed by steam distillation. The dark brown product is filtered, washed with water and crystallized from ethanol to yield red brown colored crystals melting at 156° C. Analysis for $C_{11}H_7Cl_2N_3O_2$. Found: N, 14.50%; Cl, 25.14%. Calculated: N, 14.80%; Cl, 24.97%.

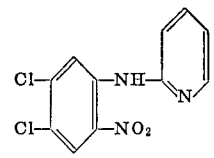

(I)

Preparation II 5,6-dichloro-2-methyl-1-(2-pyridyl)-benzimidazole

Into a flask mounted on a sand bath and provided with stirrer, condenser and thermometer, are introduced 28.4 grams of (I) and 300 ml. of glacial acetic acid. The mixture is stirred and heated. At 70–80° C. 18.5 grams of powdered zinc is added in increments, and upon completion of the addition, boiling of the reaction mixture is continued with stirring for two hours. Thereafter 20 ml. of acetic anhydride is added. The reaction mixture is boiled for about one additional hour, then hot-filtered. The filtrate is cooled and made alkaline with concentrated ammonium hydroxide. A semi-solid product which separates is thoroughly extracted with ether, and the ether extract is evaporated to dryness. The product is purified first by vacuum distillation, a very large fraction being collected between 290–330° C. at 22 mm. Hg. The product is then crystallized from ligroin. M.P.: 127–129° C. Anaylsis for $C_{13}H_9Cl_2N_3$. Found: N, 55.98%; Cl, 25.9%. Calculated N, 56.16%; Cl. 25.51%.

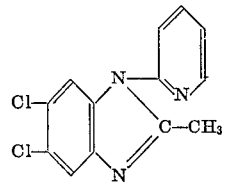

(II)

Preparation III 5,6-dichloro-2-methyl-1-(2-pyridyl)-benzimidazole ethiodide 2.78 grams of (II) are reacted at 100° C. in a sealed tube with 3 ml. of ethyl iodide for 8 hours. After standing, the solid mass is taken up, and triturated with acetone-ether mixture, filtered and washed with ether. Analysis of C₁₅H₁₄Cl₂IN₃. Found: I, 29.36%. Calculated: I, 29.24%.

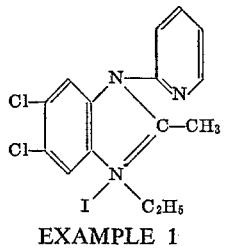

(III)

EXAMPLE 1

2.17 grams of (III) are introduced into a flask with 25 ml. of nitrobenzene and 5 ml. of ethyl orthoformate. The mixture is refluxed for three hours, then cooled and precipitated with diethyl ether. The precipitate is filtered, washed with ether, dried and triturated with hot water. The dye is filtered and recrystallized from ethanol. Absorption peak=5,240 A. The dye corresponds to the formula:

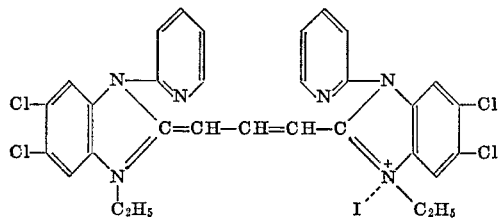

EXAMPLE 2

2.17 grams of (III) are introduced into a flask together with 1.4 grams of 2-formylmethylene-3-ethyl-5-methoxybenzoselenazole and 20 ml. of pyridine. The mixture is heated to a boil and 2 ml. of acetic anhydride is added. Then the mixture is heated for an additional 20 minutes and the product precipitated with ether. The precipitate is taken up with alcohol, then reprecipitated with ammonium perchlorate. The dye which separates in the form of a fine powder is filtered, washed with water, and recrystallized from ethanol. Absorption peak=5470 A. The dye corresponds to the formula:

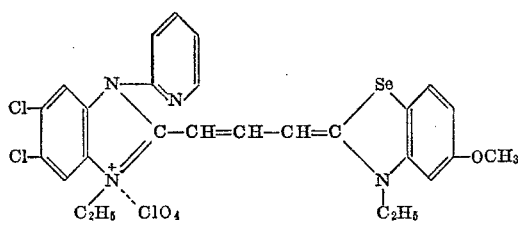

EXAMPLE 3

0.86 gram of (III) is introduced into a flask with 5 ml. of pyridine and 0.46 gram of 2-formylmethylene-3-ethyl-5,6-dimethylbenzothiazole. The mixture is heated to boiling and 0.5 ml. of acetic anhydride is added. Then the mixture is maintained at the boiling point for one additional minute before cooling. The dye which separates is filtered and washed with ethanol and ether. Absorption peak=5390 A. The dye corresponds to the formula:

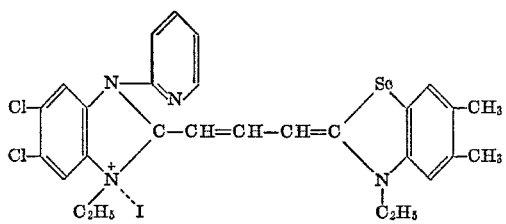

EXAMPLE 4

0.86 gram of (III) is introduced into a flask with 0.56 gram of 2-formylmethylene-3-ethyl-5,6-dimethylbenzoselenazole and 5 ml. of pyridine. The mixture is heated to the boiling point and 0.5 ml. of acetic anhydride is added. Then the mixture is boiled for 3 additional minutes before cooling. The dye which separates is filtered and washed with a mixture of alcohol and ether. Absorption peak=5,430 A. The dye corresponds to the formula:

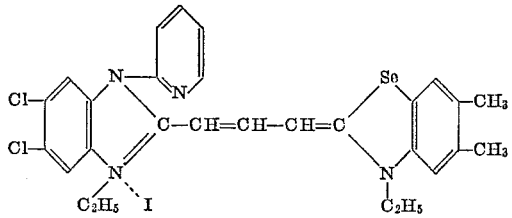

EXAMPLE 5

0.86 gram of (III), 0.48 gram of 2-formylmethylene-3-ethyl-5-chlorobenzothiazole and 5 ml. of pyridine are heated to boiling, then 0.5 ml. of acetic anhydride is added and the mixture is refluxed for two minutes. After standing, the dye which separates is filtered and washed with alcohol and ether. Absorption peak=5,300 A. The dye corresponds to the formula:

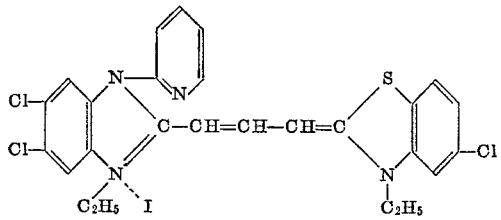

EXAMPLE 6

0.86 gram of (III), 0.53 gram of 2-formylmethylene-3-ethyl-5-methylbenzoselenazole and 5 ml. of pyridine are heated to boiling. Then 0.4 ml. of acetic anhydride is added, and the mixture is boiled for 2 minutes. After standing, the dye product separates and is filtered and washed with ethanol and ether. Absorption peak=5,380 A. The dye corresponds to the formula:

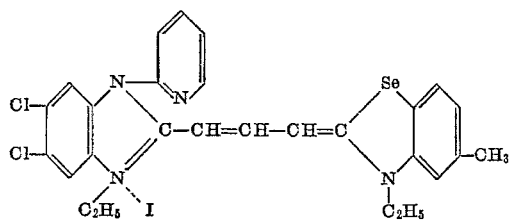

EXAMPLE 7

0.86 gram of (III) and 0.41 gram of 2-formylmethylene-3-ethyl-5-methylbenzothiazole in 9 ml. of pyridine is heated to boiling. 1 ml. of acetic anhydride is added and the mixture is boiled for 1 additional minute. After cooling and standing, the fluffy crystals which separate are filtered and washed with alcohol-ether. Absorption peak=5,350 A. The dye corresponds to the formula:

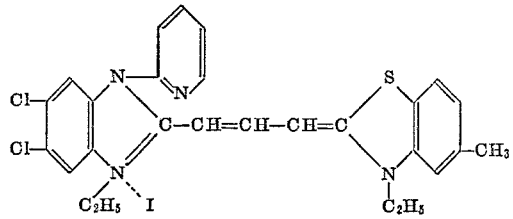

EXAMPLE 8

1.39 grams of 2-formylmethylene-1-ethylpyrrolidine and 4.3 of (III) are dissolved in 18 ml. of pyridine and heated to boiling. Then 1 ml. of acetic anhydride is added and the mixture is heated for 4 minutes, allowed to cool and stand. The dye separates as crystals which are filtered, washed with alcohol-ether and recrystallized from ethanol. Absorption peak=4,720 A. The dye corresponds to the formula:

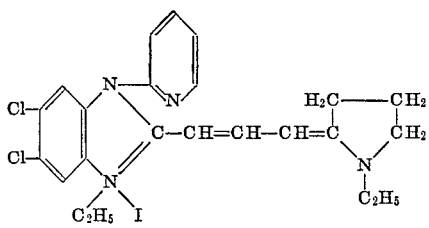

EXAMPLE 9

2.9 grams of 5-acetanilinomethylene-3-ethyl-2-thio-oxazolidone-(4) and 4.3 grams of (III) are placed into a flask together with 15 ml. of pyridine and heated at the boiling point for 20 minutes. A red dye is obtained. After the mixture has cooled upon standing, the dye is filtered, washed with boiling water and alcohol, and is then recrystallized from acetic acid. Absorption peak=4,970 A. The dye corresponds to the formula:

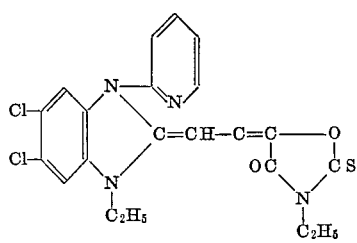

The cyanine dyes of this invention may be introduced into photographic emulsions by any of the well known methods of the photographic emulsion art, using suitable solvents which are compatible with the emulsions and which do not deleteriously affect the photosensitive material. A satisfactory procedure for preparing a gelatine/silver halide emulsion sensitized with the dyes of the invention is the following: an amount of dye is dissolved in methanol or other suitable solvent, and a volume of this solution containing 10 to 100 mg. of dye, is slowly added to about 1,000 ml. of gelatine/silver halide emulsion with continued stirring to obtain a uniform distribution of the dye in the emulsion.

The sensitizer dyes of the present invention can be employed in black-and-white or color photographic emulsions, in the presence of other sensitizer and supersensitizer compounds as well as of chemical sensitizers, antifoggants, stabilizers, surfactants, etc.

The embodiments of the invention in which an exclusive property or privilege is claimed are defined as follows:

1. A photosensitive emulsion sensitized with a cyanine dye, said cyanine dye containing as one terminal radical:

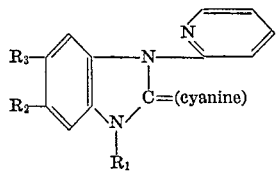

wherein $R_1$ is alkyl or allyl, $R_2$ and $R_3$ are hydrogen, halogen, acetyl or carboxamido.

2. A photosensitive emulsion sensitized with a cyanine dye derived from a condensation reaction with a quaternary salt of a heterocyclic base, said heterocyclic base having the formula:

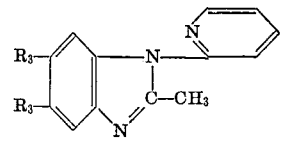

wherein $R_2$ and $R_3$ are hydrogen, halogen, acetyl or carboxamido.

3. The photosensitive emulsion of claim 2 in which said heterocyclic base has the formula:

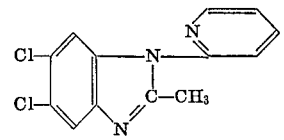

4. The photosensitive emulsion of claim 2 in which said cyanine dye has the formula:

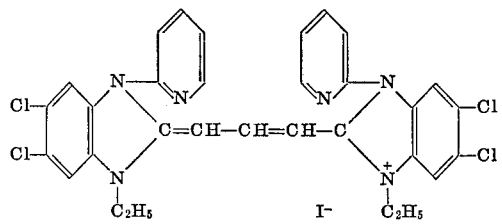

5. The photosensitive emulsion of claim 2 in which said cyanine dye has the formula:

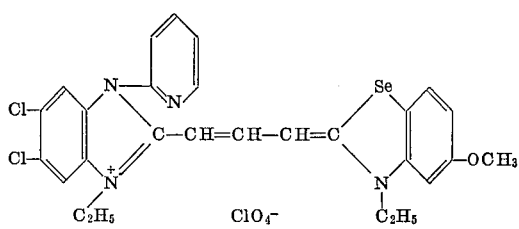

6. The photosensitive emulsion of claim 2 in which said cyanine dye has the formula:

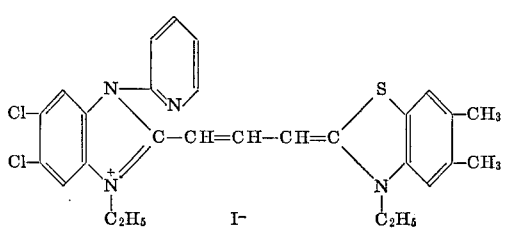

7. The photosensitive emulsion of claim 2 in which said cyanine dye has the formula:

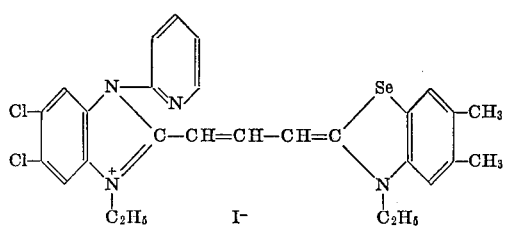

8. The photosensitive emulsion of claim 2 in which said cyanine dye has the formula:

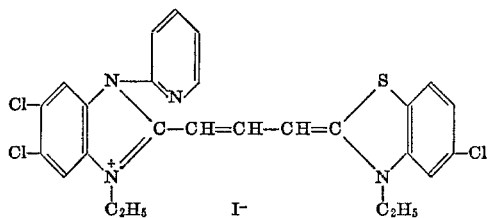

9. The photosensitive emulsion of claim 2 in which said cyanine dye has the formula:

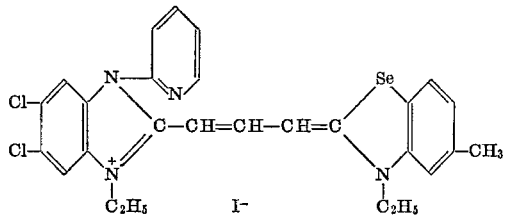

10. The photosensitive emulsion of claim 2 in which said cyanine dye has the formula:

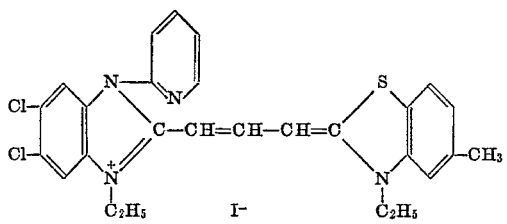

11. The photosensitive emulsion of claim 2 in which said cyanine dye has the formula:

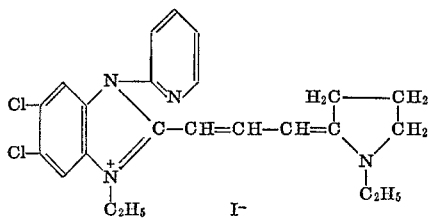

12. The photosensitive emulsion of claim 2 in which said cyanine dye has the formula:

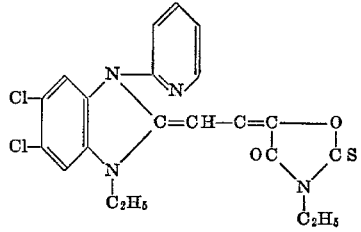

References Cited

UNITED STATES PATENTS

| | | | |
|---|---|---|---|
| 2,945,763 | 7/1960 | Jones | 96—106 |
| 3,311,618 | 3/1967 | Heseltine et al. | 96—106 |
| 3,374,232 | 3/1968 | De Stevens et al. | 96—106 |

NORMAN G. TORCHIN, *Primary Examiner.*

G. COHN, *Assistant Examiner.*

U.S. Cl. X.R.

96—105

PO-1050
(5/69)

UNITED STATES PATENT OFFICE
CERTIFICATE OF CORRECTION

Patent No. 3,443,955          Dated May 13, 1969

Inventor(s) Mario Gandino, Paolo Merli and Oreste Turilli

It is certified that error appears in the above-identified patent and that said Letters Patent are hereby corrected as shown below:

Column 6, claim 2, that portion of the formula reading $$R_3 -$$
$$R_3 -$$

should read $$R_3 -$$
$$R_2 -$$

SIGNED AND SEALED

OCT 21 1969

(SEAL)
Attest:

Edward M. Fletcher, Jr.
Attesting Officer

WILLIAM E. SCHUYLER, JR.
Commissioner of Patents